United States Patent
Lim

(10) Patent No.: US 8,275,420 B2
(45) Date of Patent: Sep. 25, 2012

(54) PORTABLE TERMINAL HAVING FLEXIBLE DISPLAY AND SCREEN CONTROLLING METHOD THEREOF

(75) Inventor: Se-Keun Lim, Incheon (KR)

(73) Assignee: LG Electronics Inc., Seoul (KR)

( * ) Notice: Subject to any disclaimer, the term of this patent is extended or adjusted under 35 U.S.C. 154(b) by 309 days.

(21) Appl. No.: 12/640,849

(22) Filed: Dec. 17, 2009

(65) Prior Publication Data

US 2010/0167791 A1 Jul. 1, 2010

(30) Foreign Application Priority Data

Dec. 30, 2008 (KR) ........................ 10-2008-0137512

(51) Int. Cl.
*H04M 1/00* (2006.01)
(52) U.S. Cl. ..................................... 455/566; 455/575.4
(58) Field of Classification Search .................. 455/566, 455/550.1, 556.2, 567, 575.1, 90.1, 575.4
See application file for complete search history.

(56) References Cited

U.S. PATENT DOCUMENTS

| | | | |
|---|---|---|---|
| 6,243,595 B1 * | 6/2001 | Lee et al. ........................ | 455/566 |
| 7,409,236 B1 * | 8/2008 | Luna et al. ................... | 455/575.1 |
| 7,426,107 B2 * | 9/2008 | Yeh et al. .................. | 361/679.27 |
| 7,513,472 B2 * | 4/2009 | Yang .......................... | 248/231.81 |
| 7,558,057 B1 * | 7/2009 | Naksen et al. ........... | 361/679.56 |
| 7,667,962 B2 * | 2/2010 | Mullen ..................... | 361/679.56 |
| 7,777,679 B2 * | 8/2010 | Lim et al. ....................... | 343/702 |
| 8,064,962 B2 * | 11/2011 | Wilcox et al. .................. | 455/566 |
| 2003/0050019 A1 * | 3/2003 | Dowling et al. ................. | 455/90 |
| 2003/0148795 A1 * | 8/2003 | Moriki .......................... | 455/566 |
| 2004/0204126 A1 * | 10/2004 | Reyes et al. ..................... | 455/566 |
| 2005/0032557 A1 * | 2/2005 | Brunstrom et al. ......... | 455/575.1 |
| 2005/0064921 A1 * | 3/2005 | Jeong et al. ............... | 455/575.4 |
| 2005/0288055 A1 * | 12/2005 | Lubowicki et al. ......... | 455/550.1 |
| 2008/0119237 A1 * | 5/2008 | Kim .............................. | 455/566 |
| 2008/0207273 A1 * | 8/2008 | Huo .............................. | 455/566 |
| 2009/0239588 A1 * | 9/2009 | Nam ............................. | 455/566 |
| 2009/0247233 A1 * | 10/2009 | Kim .............................. | 455/566 |
| 2009/0247234 A1 * | 10/2009 | Kim .............................. | 455/566 |
| 2010/0159992 A1 * | 6/2010 | Johansson ..................... | 455/566 |
| 2010/0159993 A1 * | 6/2010 | Davidson et al. ............. | 455/566 |
| 2010/0331063 A1 * | 12/2010 | Grant et al. ................ | 455/575.4 |

* cited by examiner

*Primary Examiner* — Brandon Miller
(74) *Attorney, Agent, or Firm* — Birch, Stewart, Kolasch & Birch, LLP

(57) ABSTRACT

Disclosed are a portable terminal having a flexible display, and a screen controlling method thereof. When detecting an entertainment key for a film, a game, a navigation and a DMB, a flexible display disposed inside a body is slid to a vertical direction of a main display to have an extended screen. On the other hand, when detecting an incoming call or dropping of the portable terminal in a state that the flexible display has been extended, the flexible display is restored to an initial state. This may allow a user to more conveniently appreciate various entertainments such as films, games, navigations, and DMB, and may effectively prevent damage of the portable terminal.

23 Claims, 15 Drawing Sheets

FIG. 6
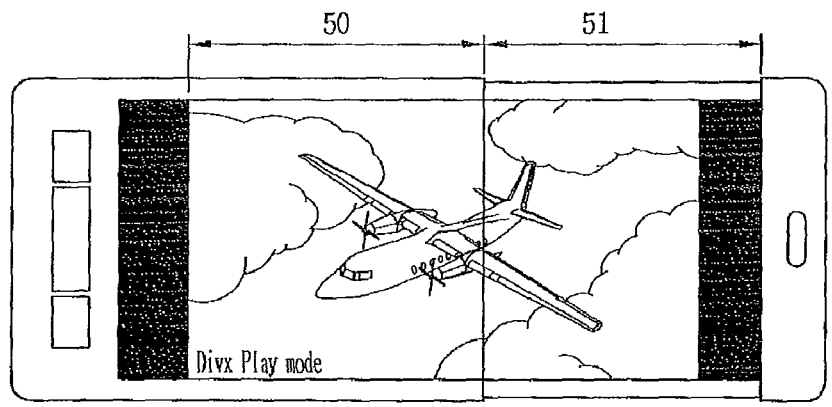
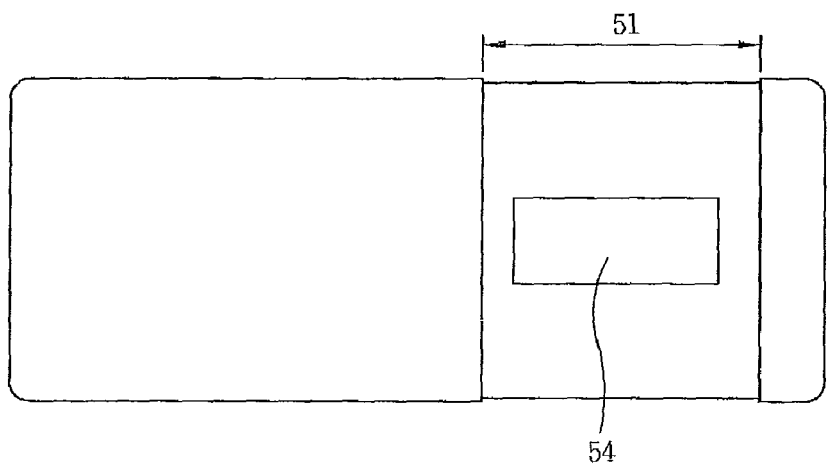
FIG. 7
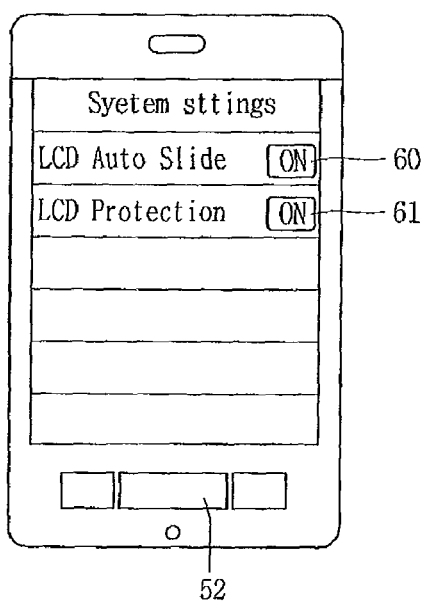

PORTABLE TERMINAL HAVING FLEXIBLE DISPLAY AND SCREEN CONTROLLING METHOD THEREOF

CROSS-REFERENCE TO A RELATED APPLICATION

Pursuant to 35 U.S.C. §119(a), this application claims the benefit of earlier filing date and right of priority to Korean Application No. 10-2008-0137512, filed on Dec. 30, 2008, the content of which is incorporated by reference herein in its entirety.

BACKGROUND OF THE INVENTION

1. Field of the Invention

The present invention relates to a portable terminal, and more particularly, to a portable terminal having a flexible display, and a screen controlling method thereof.

2. Background of the Invention

In general, a terminal such as a personal computer, a notebook, and a portable phone is configured to perform various functions. These various functions include video and voice call communications, still or moving images capturing using a camera, voice storing, music file reproducing through a speaker system, image or video displaying, etc. Some terminals include additional functions such as playing games, and other terminals are implemented as multimedia players. Moreover, recent terminals are configured to allow a user to view video or television programs by receiving broadcasting or multicast signals.

Various attempts have been made to implement enhanced functions of the terminal not only by structural improvements, but also by hardware or software improvements.

Generally, a display module of the portable terminal displays information processed by the portable terminal. For instance, when the portable terminal is in a call mode, a user interface (UI) or a graphic user interface (GUI) relating to a calling is displayed. On the other hand, when the portable terminal is in a video call mode or an image capturing mode, captured and/or received images or UI/GUI are displayed. The display module may include a liquid crystal display, a thin film transistor-liquid crystal display, an organic light-emitting diode, a flexible display, a 3D display, etc.

Among the various displays, the flexible display (or flexible LCD) is being spotlighted due to its transformable characteristic. However, it seems to take a long time to implement a complete paper type of display like a scroll which is shown in a fantasy film.

It is anticipated that a flexible LCD in an intermediate stage will be mostly used before a complete flexible LCD is to be actively commercialized. And, the flexible LCD in an intermediate stage may have a structure not greatly different from that of the current portable terminal.

Accordingly, have been proposed usage methods of the flexible display in a portable terminal, and protection methods for the flexible display.

SUMMARY OF THE INVENTION

Therefore, an object of the present invention is to provide a portable terminal capable of properly controlling a screen size when appreciating entertainments and when an incoming call is received in an extendable display structure, and a screen controlling method thereof.

Another object of the present invention is to provide a portable terminal capable of safely protecting a display slidable in an extendable display structure, and a screen controlling method thereof.

To achieve these and other advantages and in accordance with the purpose of the present invention, as embodied and broadly described herein, there is provided a portable terminal, comprising: a main liquid crystal display (LCD); a flexible LCD disposed in a body, and configured to be extendable to outside; and a controller configured to extend the screen by sliding the flexible LCD when input of a predetermined key has been detected, and configured to restore the slid flexible LCD to an initial state when an incoming call is received or the portable terminal is dropping in a state that the screen has been extended.

The flexible LCD may be disposed in a body so as to overlap the main LCD, or may be disposed at a predetermined region in a rolled state like a scroll so as to be slid along a guide disposed at an inner side surface of the body.

The predetermined key may be implemented as an entertainment key or a slide button. And, the entertainment key may comprise a film key, a DMB key, a game key, and a navigation key.

A sliding degree of the flexible LCD may be set to be different according to a type of an entertainment being executed, or may be set to be same by being set as a default.

When the entertainment key is input, the controller may display an operation mode of the portable terminal on the main LCD if an LCD sliding menu is in an 'ON' state, and may automatically slide the flexible LCD to a vertical direction of the main LCD.

The controller may restore the flexible LCD to an initial state when a voice call is received, and may display a video call screen on the main LCD and display a message inquiring whether to restore the flexible LCD to the initial state when a video call is received.

The controller may slide the flexible LCD step by step according to the number of times that the slide button is input.

The controller may restore the flexible LCD to the initial state in an to emergency mode when an acceleration more than a threshold value of the portable terminal which is dropping has been detected.

To achieve these and other advantages and in accordance with the purpose of the present invention, as embodied and broadly described herein, there is also provided a screen controlling method for a portable terminal, the is method comprising: detecting an input of a predetermined key; extending a screen by sliding a flexible LCD disposed in a body when the input of the predetermined key has been detected; executing predetermined entertainments on the extended screen; and restoring the slid flexible LCD to an initial state when an incoming call is received while executing the entertainments.

The predetermined key may be implemented as an entertainment key or a slide button. And, the entertainment key may comprise a film key, a DMB key, a game key, and a navigation key.

A sliding degree of the flexible LCD may be set to be different according to a type of an entertainment being executed, or may be set to be same by being set as a default.

The step of extending a screen may comprise checking a setting state of an LCD slide menu when the entertainment key is input; and displaying an operation mode executed by the entertainment key on a main LCD when the LCD sliding menu is in an 'ON' state, and automatically sliding the flexible LCD to a vertical direction of the main LCD according to the operation mode.

The step of restoring the flexible LCD may comprise determining whether an incoming call is a voice call; checking whether an external headset is connected to the portable terminal if the received incoming call is a voice call; restoring the flexible LCD to an initial state if the external headset is not connected to the portable terminal; and displaying a video call screen on a predetermined region on the main LCD when the received incoming call is a video call.

The step of restoring the flexible LCD may comprise detecting an acceleration of the portable terminal which is dropping; and restoring the flexible LCD at a maximum speed when the detected acceleration of the portable terminal which is dropping is more than a preset threshold value.

The step of sliding or restoring the flexible LCD may be automatically executed according to an input of an entertainment key, or may be executed step by step according to an input frequency and an input time of a slide button.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6 is a view showing a structure of a rear surface of a flexible LCD in FIG. 5;

FIG. 7 is a configuration view of a system menu for setting an LCD auto slide mode and an LCD protection mode in the portable terminal according to a first embodiment of the present invention;

DETAILED DESCRIPTION OF THE INVENTION

Description will now be given in detail of the present invention, with reference to the accompanying drawings.

Hereinafter, a portable terminal according to the present invention will be explained in more detail with reference to the attached drawings. The suffixes attached to components of the wireless speaker, such as 'module' and 'unit or portion' were used for facilitation of the detailed description of the present invention. Therefore, the suffixes do not have different meanings from each other.

A terminal may be implemented in various types. For instance, the terminal in the present description includes a mobile terminal such as a portable phone, a smart phone, a notebook computer, a digital broadcasting terminal, Personal Digital Assistants (PDA), Portable Multimedia Player (PMP), a navigation system, and a fixed terminal such as a digital TV, a desktop computer, etc. It is assumed that the terminal of the present invention is a mobile terminal. However, it will be obvious to those skilled in the art that the present invention may be also applicable to the fixed terminal, except for specific configurations for mobility.

Figure 1:
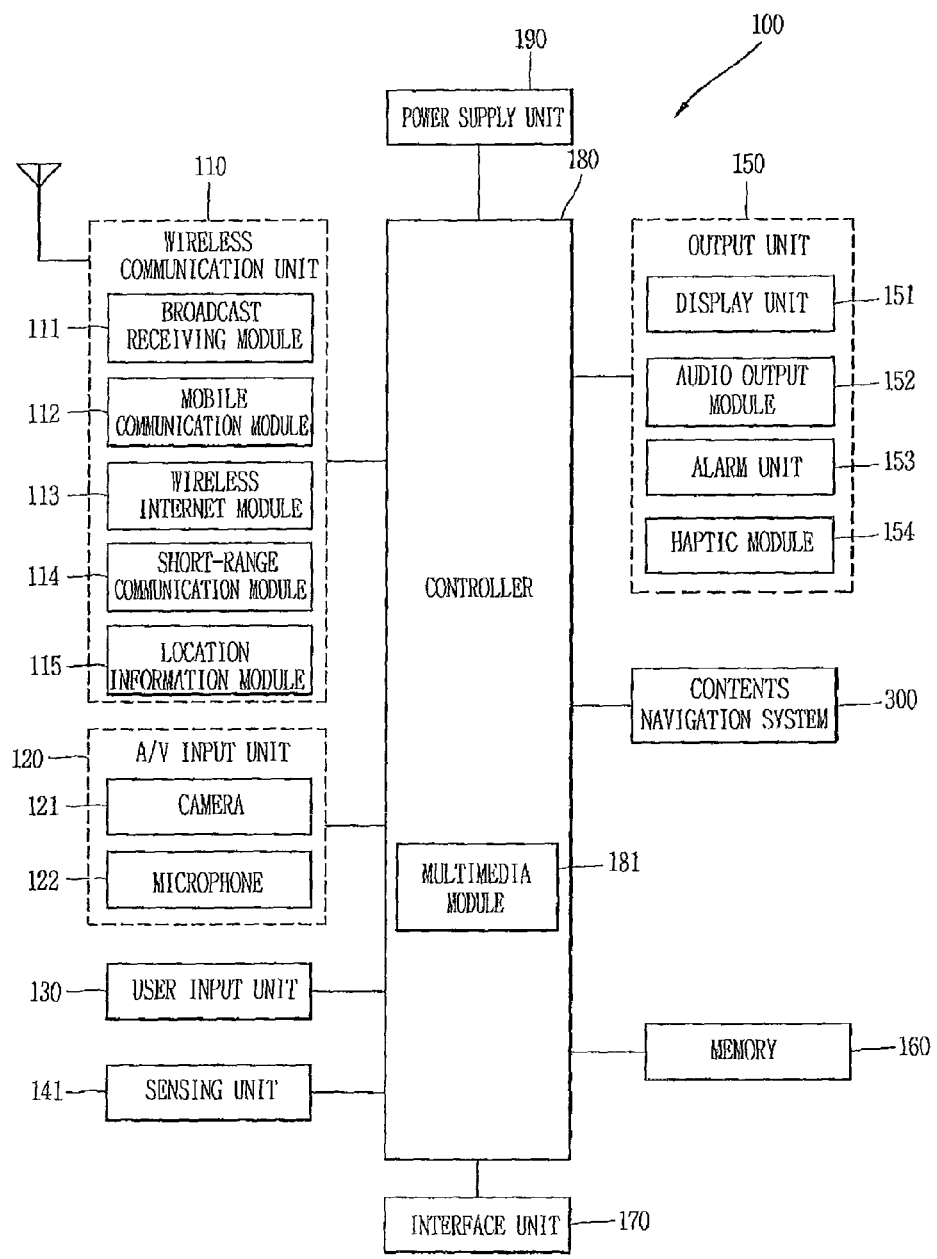
FIG. 1 is a block diagram of a portable terminal according to a first embodiment of the present invention.

FIG. 1 is a block diagram of a portable terminal in accordance with one exemplary embodiment of the present invention.

The portable terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply unit 190 and the like. FIG. 1 shows the portable terminal 100 having various components, but it is understood that implementing all of the illustrated components is not a requirement. More or less components may alternatively be implemented.

Hereinafter, each component is described in sequence.

The wireless communication unit 110 may typically include one or more modules which permit wireless communications between the portable terminal 100 and a wireless communication system or between the portable terminal 100 and a network within which the portable terminal 100 is located. For example, the wireless communication unit 110 may include a broadcast receiving module 111, a mobile communication module 112, a wireless internet module 113, a short-range communication module 114, a position location module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the portable terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

Referring to FIG. 1, the A/V input unit 120 is configured to provide audio or video signal input to the portable terminal. The A/V input unit 120 may include a camera 121 and a microphone 122. The camera 121 receives and processes image frames of still pictures or video obtained by image sensors in a video call mode or a capturing mode. The processed image frames may be displayed on a display module 151.

The image frames processed by the camera 121 may be stored in the memory 160 or transmitted to the exterior via the wireless communication unit 110. Two or more cameras 121 may be provided according to the configuration of the portable terminal.

The microphone 122 may receive an external audio signal while the portable terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data inputted by a user to control the operation of the portable terminal. The user input unit 130 may include a keypad, a dome switch, a touchpad (e.g., static pressure/capacitance), a jog wheel, a jog switch and the like.

The sensing unit 140 provides status measurements of various aspects of the portable terminal. For instance, the sensing unit 140 may detect an open/close status of the portable terminal, a change in a location of the portable terminal 100, a presence or absence of user contact with the portable terminal 100, the location of the portable terminal 100, acceleration/deceleration of the portable terminal 100, and the like, so as to generate a sensing signal for controlling the operation of the portable terminal 100. For example, regarding a slide-type portable terminal, the sensing unit 140 may sense whether a sliding portion of the portable terminal is open or closed. Other examples include sensing functions, such as the sensing unit 140 sensing the presence or absence of power provided by the power supply unit 190, the presence or absence of a coupling or other connection between the interface unit 170 and an external device. The sensing unit 140 may include a proximity sensor 141.

The output unit 150 is configured to output an audio signal, a video signal or a tactile signal. The output unit 150 may include a display module 151, an audio output module 152, an alarm 153, a haptic module 154, and the like.

The display module 151 may output information processed in the portable terminal 100. For example, when the portable terminal is operating in a phone call mode, the display module 151 will provide a User Interface (UI) or a Graphic User Interface (GUI) which includes information associated with the call. As another example, if the portable terminal is in a video call mode or a capturing mode, the display module 151 may additionally or alternatively display images captured and/or received, UI, or GUI.

The display module 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display module 151 may also be implemented to be optically transparent. Under this configuration, a user can view an object positioned at a rear side of a terminal body through a region occupied by the display module 151 of the terminal body. The display module 151 may be implemented in two or more in number according to a configured aspect of the portable terminal 100. For instance, a plurality of the display units 151 may be arranged on one surface to be spaced apart from or integrated with each other, or may be arranged on different surfaces.

Here, if the display module 151 and a touch sensitive sensor (referred to as a touch sensor) have a layered structure therebetween, the structure may be referred to as a touch screen. The display module 151 may be used as an input device rather than an output device. The touch sensor may be implemented as a touch film, a touch sheet, a touch pad, and the like.

The touch sensor may be configured to convert changes of a pressure applied to a specific part of the display module 151, or a capacitance occurring from a specific part of the display module 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display module 151 has been touched.

Still referring to FIG. 1, a proximity sensor 141 may be arranged at an inner region of the portable terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the portable terminal 100, e.g., sound alarming a call received or a message received, and so on. The audio output module 152 may include a receiver, a speaker, a buzzer, and so on.

The alarm 153 outputs signals notifying occurrence of events from the portable terminal 100. The events occurring from the portable terminal 100 may include call received, message received, key signal input, touch input, and so on. The alarm 153 may output not only video or audio signals, but also other types of signals such as signals notifying occurrence of events in a vibration manner. Since the video or audio signals can be output through the display module 151 or the audio output unit 152, the display module 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the portable terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card imcro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the portable terminal 100 may operate a web storage which performs the storage function of the memory 160 on the Internet.

The interface unit 170 may generally be implemented to interface the portable terminal with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the portable terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the portable terminal 100 via a port.

Also, the interface unit 170 may serve as a path for power to be supplied from an external cradle to the portable terminal 100 when the portable terminal 100 is connected to the external cradle or as a path for transferring various command signals inputted from the cradle by a user to the portable terminal 100. Such various command signals or power inputted from the cradle may operate as signals for recognizing that the portable terminal 100 has accurately been mounted to the cradle.

The controller 180 typically controls the overall operations of the portable terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2:
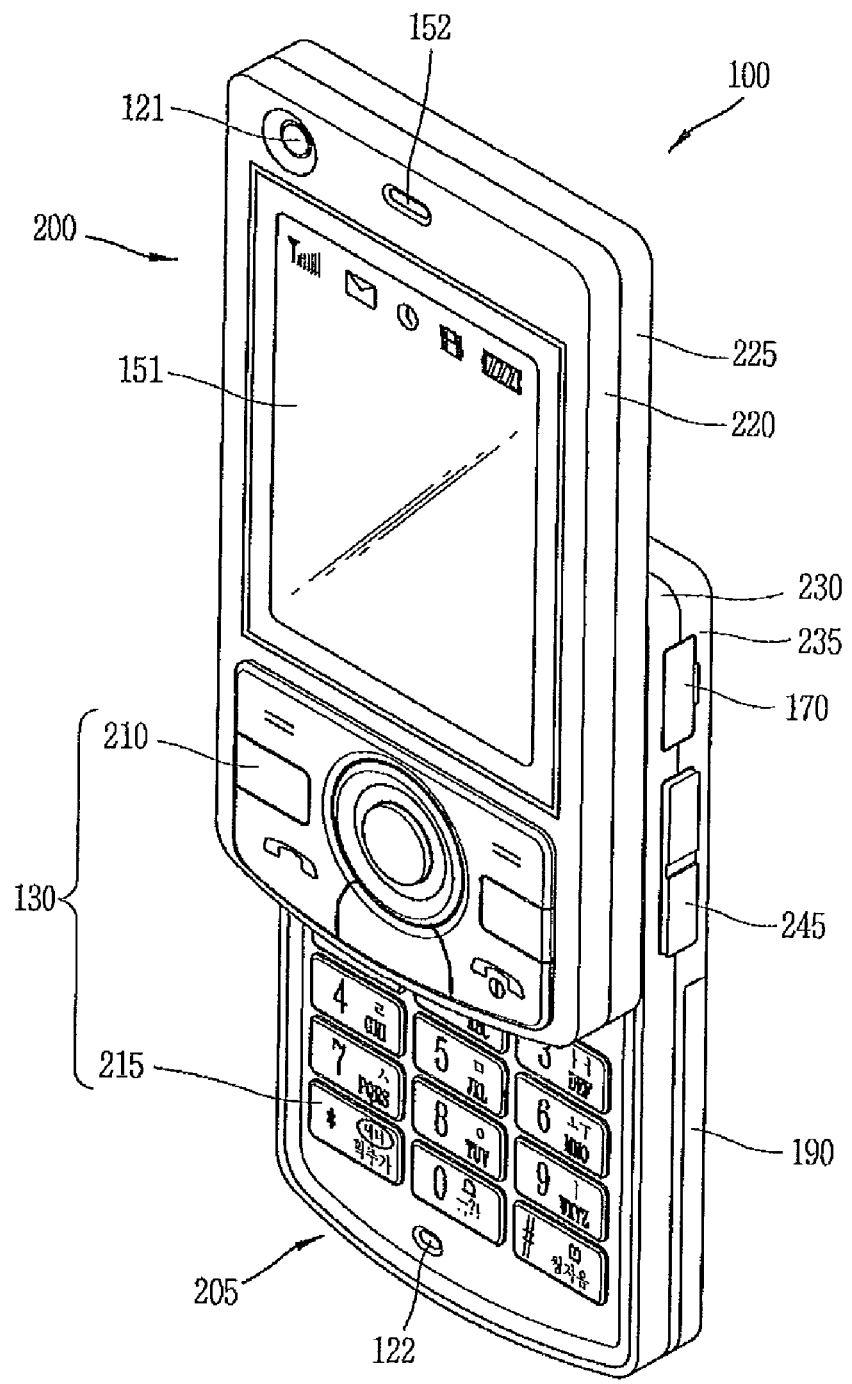
FIG. 2 is a front perspective view of the portable terminal according to a first embodiment of the present invention.

FIG. 2 is a front perspective view of the portable terminal in accordance with the one embodiment of the present invention.

The portable terminal 100 described is a slide type portable terminal having two bodies coupled to each other to be relatively movable. However, the present invention is not limited to the type, but applicable to various configurations, such as a bar type, a folder type, a swing type, a swivel type and the like.

A portable terminal according to the present invention may include a first body 200, and a second body 205 sliding with respect to the first body 200 in at least one direction.

The first body 200 is positioned over the second body 205, which is referred to as a closed position (closed state or closed configuration). As shown in FIG. 1, the first body 200 exposes at least part of the second body 205, which is referred to as an open position (open state or open configuration).

Although not shown, the portable terminal may be a folder type including a first body, and a second body having one or more sides folded to or unfolded from the first body. Here, a state that the second body is folded to the first body may be referred to as a 'closed state', whereas a state that the second body is unfolded from the first body may be referred to as an 'open state'.

Although not shown, the portable terminal may be a swing type including a first body, and a second body configured to swing with respect to the first body. Here, a state that the first body is arranged to overlap the second body may be referred to as a 'closed state', whereas a state that a part of the first body is exposed as the second body swings may be referred to as an 'open state'.

Detailed explanations for the folder type terminal and the swing type terminal will be omitted since they have been already well-known to those skilled in the art.

The portable terminal 100 may typically operate in a standby mode in the closed configuration but such standby mode may be released according to a user's manipulation. Also, the portable terminal 100 may typically operate in a call-communication mode in the open configuration but such mode may be converted into the standby mode according to the user's manipulation or after a certain time duration.

A case (casing, housing, cover, etc.) forming an outer appearance of the first body 200 may be formed from a first front case 220 and a first rear case 225. A space formed by the first front case 220 and the first rear case 225 may accommodate various components therein. At least one intermediate case may further be disposed between the first front case 220 and the first rear case 225.

Such cases may be formed by injection-molded synthetic resin, or may be formed using a metallic material such as stainless steel (STS) or titanium (Ti).

The first body 200, in detail, the first front case 220 is shown having a display module 151, a first audio output module 152, a first camera 121, a user input unit 210, and the like.

The display module 151 was aforementioned with reference to FIG. 1, and thus its detailed explanations will be omitted.

The audio output module 152 may be implemented in the form of a speaker.

The camera 121 may be configured to capture a user's still image or moving image.

Similar to the first body 200, the case of the second body 205 may be formed by a second front case 230 and a second rear case 235.

A second manipulation unit 215 may be disposed at the second body 205, particularly, at a front surface of the second front case 230.

At least one of the second front case 230 or the second rear case 235 may be provided with a third manipulation unit 245, a microphone 122, and an interface unit 170.

The first to third manipulation units 210, 215 and 245 may be referred to as a user input unit 130. Such manipulating portion can employ any tactile manner that a user can touch or tap for manipulation.

For instance, the manipulation portion may be implemented as a dome switch, a touch screen, a touchpad or the like by which a user can input commands or information in a pushing or touching manner. Alternatively, the manipulating portion may be implemented as a wheel or a jog which rotates keys or a joystick.

From the functional perspective, the first user input unit 210 is configured to input commands such as START, END, SCROLL or the like, and the second user input unit 215 is configured to input numbers, letters (characters), symbols or the like. The first user input unit 210 may include soft keys communicated with icons on the display module 151, and navigation keys (four directional keys and one central key) for directional indication and certification.

Also, the third user input unit 245 may serve as a hot key which performs a specific function, such as activating a component inside the portable terminal.

The microphone 122 may be implemented in a form suitable for receiving a user's voice, another sound, etc.

The interface unit 170 may serve as a passage through which the portable terminal 100 exchanges data with an external device, etc. The interface unit 170 was aforementioned with reference to FIG. 1, and thus its detailed explanations will be omitted.

The power supply unit 190 for supplying power to the portable terminal is mounted to the second rear case 235.

The power supply unit 190 may be implemented as a rechargeable battery to be detachably mounted to the second rear case 235.

Figure 3:
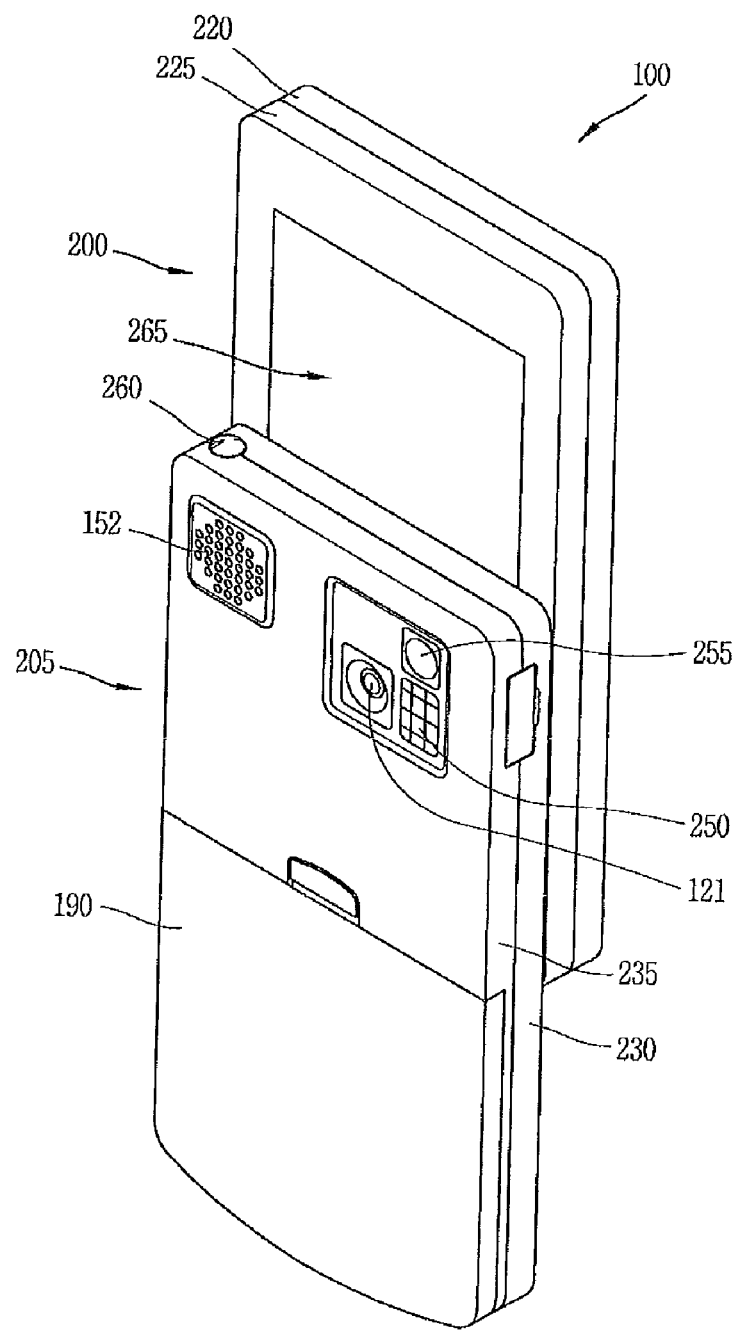
FIG. 3 is a rear perspective view of the portable terminal according to a first embodiment of the present invention.

FIG. 3 is a rear perspective view of the portable terminal of FIG. 2.

As shown in FIG. 3, a rear surface of the second rear case 235 of the second body 205 may further be provided with a camera 121. The camera 121 of the second body 205 faces a direction which is opposite to a direction faced by the camera 121 of the first body 200, and may have different pixels from those of the camera 121 of the first body 200.

For example, the camera 121 of the first body 200 may operate with relatively lower pixels (lower resolution). Thus, the first camera 121 may be useful when a user can capture his face and send it to another party during a video call or the like. On the other hand, the camera 121 of the second body 205 may operate with a relatively higher pixels (higher resolution) such that it can be useful for a user to obtain higher quality pictures for later use.

A flash 250 and a mirror 255 may additionally be disposed adjacent to the camera 121 of the second body 205. The flash 250 operates in conjunction with the camera 121 of the second body 205 when taking a picture using the camera 121 of the second body 205. The mirror 255 can cooperate with the camera 121 of the second body 205 to allow a user to photograph himself in a self-portrait mode.

An audio output module 152 may further be disposed at the second rear case 235.

The audio output module 152 of the second body 205 can cooperate with the audio output module 152 of the first body 200 to provide stereo output. Also, the audio output module 152 may be configured to operate as a speakerphone.

A broadcast signal receiving antenna 260 may further be disposed at one side of the second rear case 235 in addition to an antenna for communications, for example. The antenna 260 may be retractable into the second body 205.

A part of a slide module 265 for slidably coupling the first body 200 to the second body 205 may be disposed at the first rear case 225 of the first body 200.

Another part of the slide module 206 may be disposed at the second front case 230 of the second body 205, so as not to be exposed to the exterior as shown in drawing.

As described above, it has been described that the second camera 121 or the like is disposed at the second body 205; however, the present invention may not be limited to the configuration.

It is also possible that one or more of those components, which have been described to be implemented on the second rear case 235, such as the camera 121 of the second body, will be implemented on the first body 200, particularly, on the first rear case 225. In this configuration, the component(s) disposed on the first rear case 225 can be protected by the second body 205 in a closed state of the portable terminal. In addition, without the camera 121 of the second body, the camera 121 of the first body can be implemented to be rotatable so as to rotate up to a direction which the camera 121 of the second body faces.

In addition, the portable terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

Figure 4:
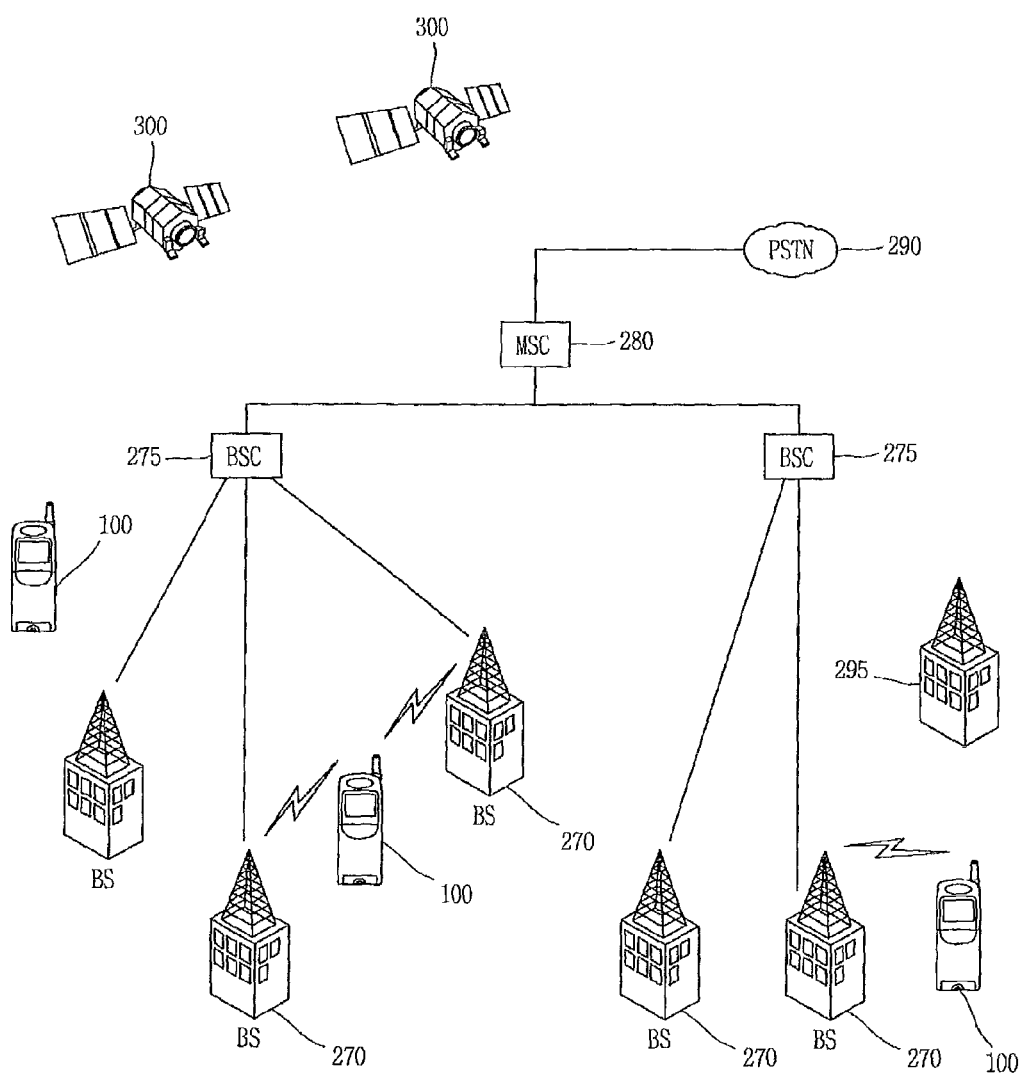
FIG. 4 is a block diagram of a wireless communication system where the portable terminal according to a first embodiment of the present invention can operate.

Next, FIG. 4 illustrates a CDMA wireless communication system having a plurality of portable terminals 100, a plurality of base stations 270, a plurality of base station controllers (BSCs) 275, and a mobile switching center (MSC) 280. The MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or xDSL. Further, the system may include more than two BSCs 275.

Also, each base station 270 may include one or more sectors, each sector having an omnidirectional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270.

The base stations 270 may also be denoted as "cell sites." Alternatively, individual sectors of a given base station 270 may be referred to as cell sites. Further, a terrestrial digital multimedia broadcasting (DMB) transmitter 295 is shown broadcasting to portable terminals 100 operating within the system.

In addition, the broadcast receiving module 111 (FIG. 1) of the portable terminal 100 is typically configured to receive broadcast signals transmitted by the DMB transmitter 295. Similar arrangements may be implemented for other types of broadcast and multicast signaling as discussed above.

FIG. 4 further illustrates several global positioning system (GPS) satellites 300. Such satellites facilitate locating the position of some or all of the portable terminals 100. In FIG. 4, two satellites are shown, but positioning information may be obtained with greater or fewer satellites. In addition, the position-location module 115 (FIG. 1) of the portable terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during typical operation of the wireless communication system, the base stations 270 receive sets of reverse-link signals from various portable terminals 100. The portable terminals 100 engage in calls, messaging, and other communications. In addition, each reverse-link signal received by a given base station 270 is processed within that base station 270, and the resulting data is forwarded to an associated BSC 275. The BSC 275 provides call resource allocation and mobility management functionality including soft handoffs between the base stations 270. Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the portable terminals 100.

The portable terminal having an extendable display according to the present invention has a structure that some parts of the entire part of a flexible LCD is extended (slid) to the outside when a user uses entertainments such as games and films. The extendable display structure may include a slide structure, a scroll structure, and any other structures coupled to a main LCD.

The flexible display (e.g., flexible LCD) has an extendable display structure that approximately 30~40% of the entire flexible LCD is extended (slid) to the outside.

The present invention provides a portable terminal capable of properly controlling a screen size when using entertainments or when receiving an incoming call in the extendable display structure, and a screen controlling method thereof. More concretely, the present invention provides a screen controlling method capable of effectively controlling a screen when a flexible LCD is slid to the outside of a portable terminal having an extendable display structure.

Since the display slid (extended) in the extendable display structure is fabricated to have a wide area and a thin thickness, it may be easily damaged by an external impact in a slid (extended) state.

Accordingly, the present invention provides a method for safely protecting a flexible display which is slid in an extendable display structure.

In order to effectively control a screen and protect an extended (slid) flexible display in the extendable display structure, each component shown in FIG. 1 has to perform the following operation.

The sensing unit 140 of FIG. 1 provides status measurements of various aspects of the portable terminal. For instance, the sensing unit 140 may detect an open/close status of the portable terminal, a change in a location of the portable terminal 100, a presence or absence of user contact with the portable terminal 100, the location of the portable terminal 100, acceleration/deceleration of the portable terminal 100, and the like, so as to generate a sensing signal for controlling the operation of the portable terminal 100. For example, regarding a slide-type portable terminal, the sensing unit 140 may sense whether a sliding portion of the portable terminal is open or closed. Other examples include sensing functions, such as the sensing unit 140 sensing the presence or absence of power provided by the power supply unit 190, the presence or absence of a coupling or other connection between the interface unit 170 and an external device.

The portable terminal according to the present invention comprises a motor controller, a motor driving unit, and a motor so as to effectively slide the flexible display. The motor controller may be controlled by the controller 180, and may slide the flexible display to a minimum or maximum state. And, the motor controller may slide the flexible display step by step.

In a case where an 'auto slide mode' is selected from a display extension menu by a user, when the following function is executed by the portable terminal, the controller 180 automatically slides the flexible display to the outside.

When selecting an entertainment function such as games and films: Sliding of the flexible LCD When receiving an incoming call while executing entertainments: Restoration of the flexible LCD When detecting fall-down of the portable terminal while executing entertainments: Restoration of the flexible LCD Hereinafter, the flexible display will be referred to as a flexible LCD for convenience.

In order to extend the flexible LCD, the controller 180 outputs a driving control signal to a motor driving unit (not shown). And, an LCD sliding motor is driven by the driving control signal. The LCD sliding motor has a small size, and may be rotated in a forward or backward direction. And, the LCD sliding motor may have a speed controlled step by step (highest speed at an emergency mode). Here, the controller 180 does not slide the flexible LCD when an external force against the sliding has been detected.

When an incoming call is received in a state that the flexible LCD is in an extended state (slid state), the controller 180 checks whether the interface unit 170 is in a connected state to an external headset (e.g., Bluetooth Headset) based on a sensing signal output from the sensing unit 140. If the interface unit 170 is in a connected state to an external headset (e.g., Bluetooth Headset) as a result of the check, the slid state of the flexible LCD is maintained. On the contrary, if the interface unit 170 is not in a connected state to an external headset, the flexible LCD is restored to the initial state.

When an incoming call has been detected in a state that the flexible LCD is in an extended state (slid state), or when acceleration/deceleration of the portable terminal 100 is checked based on a detection signal from the sensing unit 140, the controller 180 restores the slid flexible LCD to the initial state.

When an impact is to be applied onto the flexible LCD while executing entertainments such as films, the controller 180 restores the slid state to the initial state. Accordingly, the flexible LCD may have a minimized impact.

Figure 5:
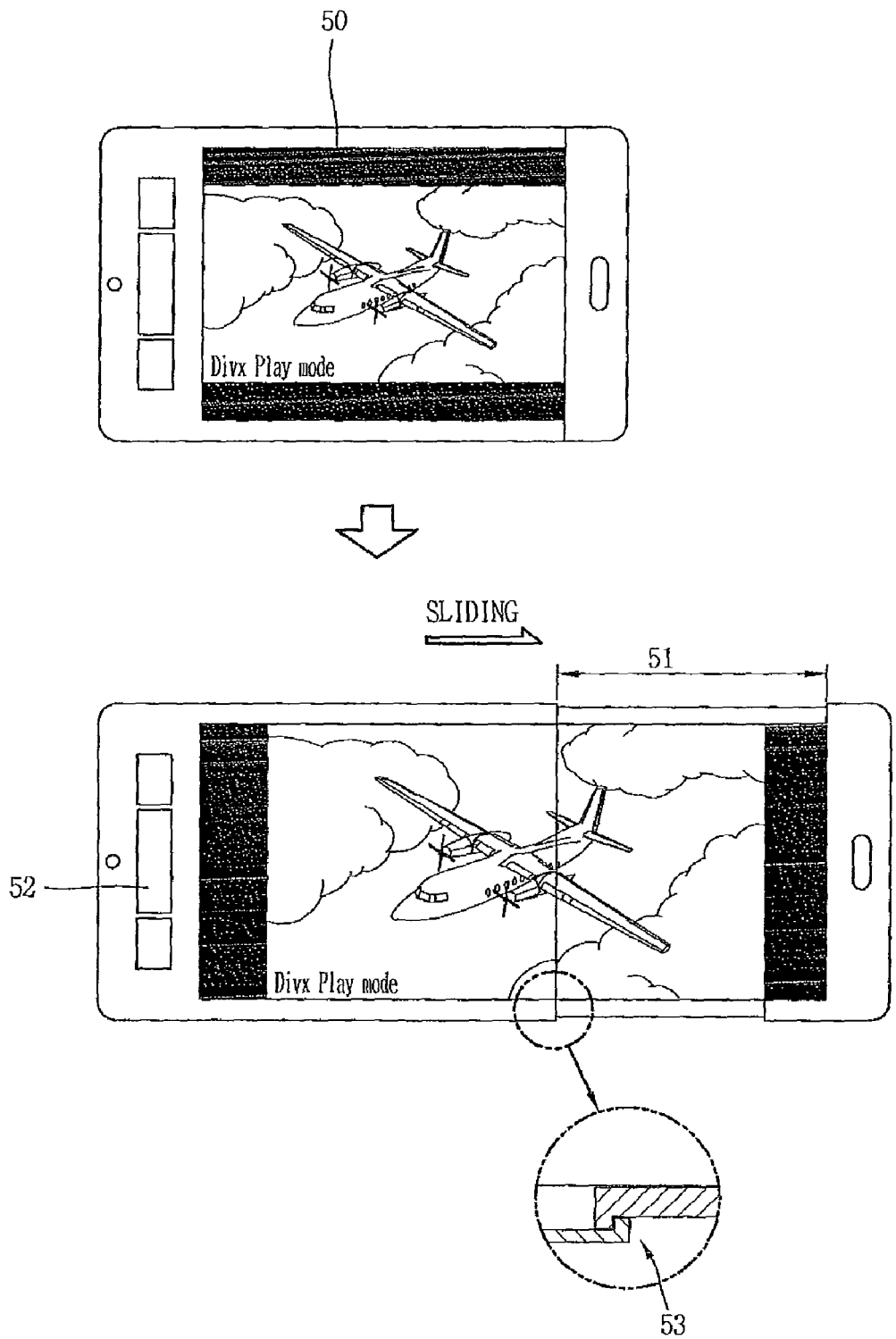
FIG. 5 is a view showing a sliding structure of the portable terminal according to a first embodiment of the present invention.

FIG. 5 is a view showing a sliding structure of the portable terminal according to a first embodiment of the present invention.

As shown in FIG. 5, the portable terminal according to the present invention has a structure that the flexible LCD 51 is automatically (or selectively) slid to the outside of the main LCD 50 when executing entertainments such as games or films. That is, the portable terminal has a structure that the flexible LCD 51 located in a body is extended to a vertical direction of the portable terminal in a sliding manner when an entertainment function is executed.

When a voice call is received or an input of a call button by a user has been detected while entertainments are executed, the slid flexible LCD 51 is automatically or selectively restored to the initial state under control of the controller 180.

LCD slide buttons 52 are provided at a lower end of the portable terminal so as to manually extend the flexible LCD 51. The flexible LCD 51 is extended by one step whenever the LCD slide button 52 is pressed one time, and is extended to a maximum size when the LCD slide button 52 is pressed for a long time (about one second).

The flexible LCD 51 may be disposed to overlap the main LCD 50 at an inner side of the body of the portable terminal, or may be disposed at a separate region from the main LCD 50 in the form of a scroll. And, the flexible LCD 51 is extended to a vertical direction of the main LCD 50 when being slid. Accordingly, the portable terminal comprises therein a driving unit such as a motor configured to slide the flexible LCD 51.

A guide 53 configured to guide sliding of the flexible LCD 51 may be provided at an inner side surface the body of the portable terminal. The guide 53 allows the flexible LCD to maintain a predetermined shape (flat shape) and to be smoothly slid. The flexible LCD 51 is designed so as to maintain the same stiffness as that of the conventional LCD when being slid. For instance, as shown in FIG. 6, a strong material 54 such as plastic may be attached to a rear surface of the flexible LCD 51 so as to protect the slid flexible LCD 51.

Hereinafter, a screen controlling method for a portable terminal having an extendable display structure according to the present invention will be explained in more detail with reference to the attached drawings.

FIG. 7 is a configuration view of a system menu for setting an LCD auto slide mode and an LCD protection mode in a portable terminal according to a first embodiment of the present invention;

As shown in FIG. 7, the system menu includes an LCD slide menu (LCD auto slide) 60 for extending the flexible LCD 51, and an LCD protection menu 61 for automatically restoring the slid flexible LCD 51 to the initial state in the event of the occurrence of a predetermined impact on the portable terminal.

A user sets the LCD slide menu 60 and the LCD protection menu 61 of the system menu as 'ON' or 'OFF'. Accordingly, when the user appreciates a film or views a DMB, the controller 180 automatically extends the flexible LCD 51 based on a setting state of the LCD slide menu 60. Under this state, if a predetermined impact is applied to the portable terminal, the controller 180 automatically restores the flexible LCD 51 to the initial state based on a setting state of the LCD protection menu 61.

Figure 8:
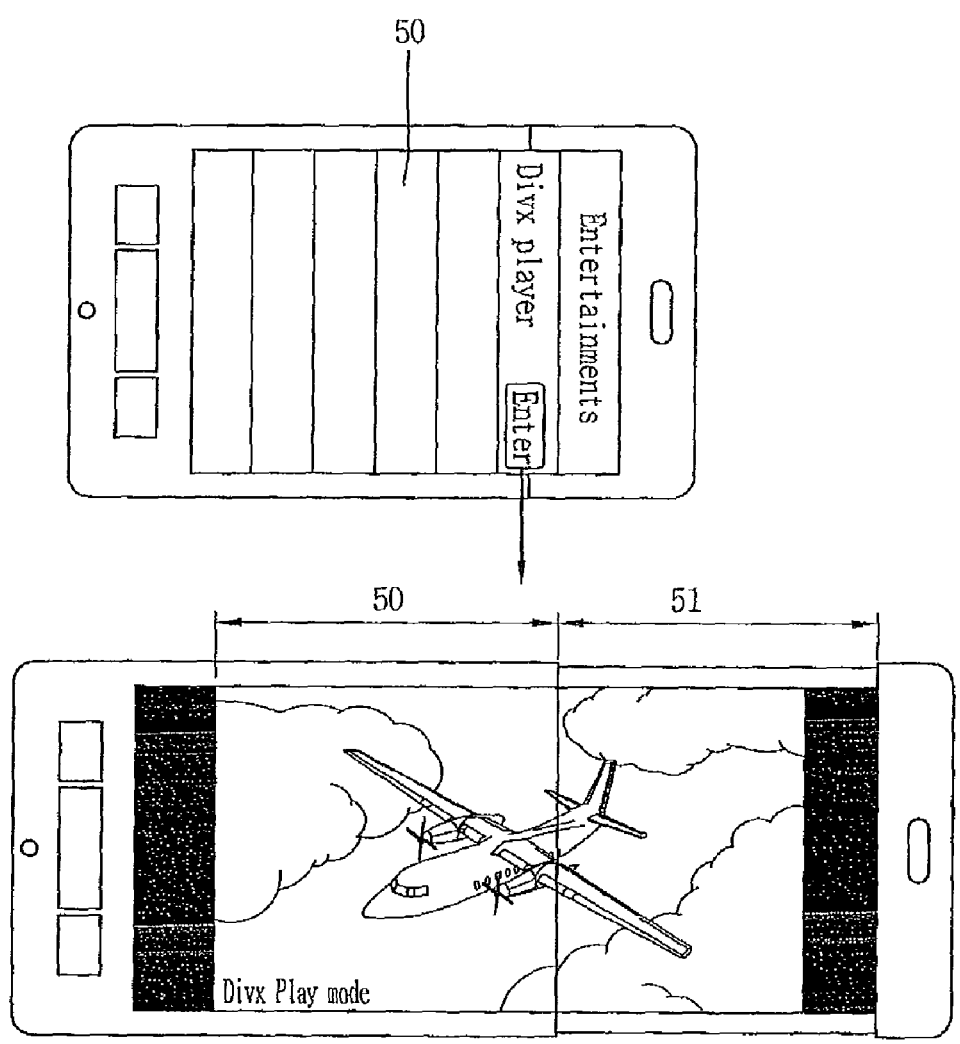
FIG. 8 is a view showing an example to automatically slide a flexible LCD when executing entertainments according to the present invention.

FIG. 8 is a view showing an example to automatically slide the flexible LCD when executing entertainments according to the present invention.

Once the user inputs (touches) an entertainment key, the controller 180 checks a setting state of the LCD slide menu 60. The entertainment key may comprise a film key (e.g., Divx player), a DMB key, a game key, and a navigation key.

When the LCD slide menu 60 is set as an 'ON' state by the user, the controller 180 displays a film mode (Divx Play mode) on the main LCD 50, and automatically slides the flexible LCD 51 disposed (or rolled) in the portable terminal by controlling the LCD sliding motor through the motor driving unit. Accordingly, the user may view his or her desired film on the main LCD 50 and the slid flexible LCD 51.

A sliding (extended) degree of the flexible LCD 51 to the outside may be implemented according to a menu setting. For instance, the sliding degree of the flexible LCD 51 may be set to be different according to a reproduction genre, i.e., a type of an entertainment such as a game, a film, and a DMB. In case of the game, the sliding degree of the flexible LCD 51 is smaller than that in case of the film or the DMB.

Extension information of the flexible LCD 51 according to a reproduction genre is stored in the memory 160. However, the present invention may not be limited to this. That is, the sliding degree of the flexible LCD 51 may be set as a default value.

While the flexible LCD 51 is slid to the outside, when an external force against the sliding is applied, i.e. when the user is to stop the flexible LCD 51 which is being extended or when the flexible LCD 51 comes in contact with any object, the controller 180 restores the flexible LCD 51 to the initial state by controlling the LCD sliding motor.

Figure 9:
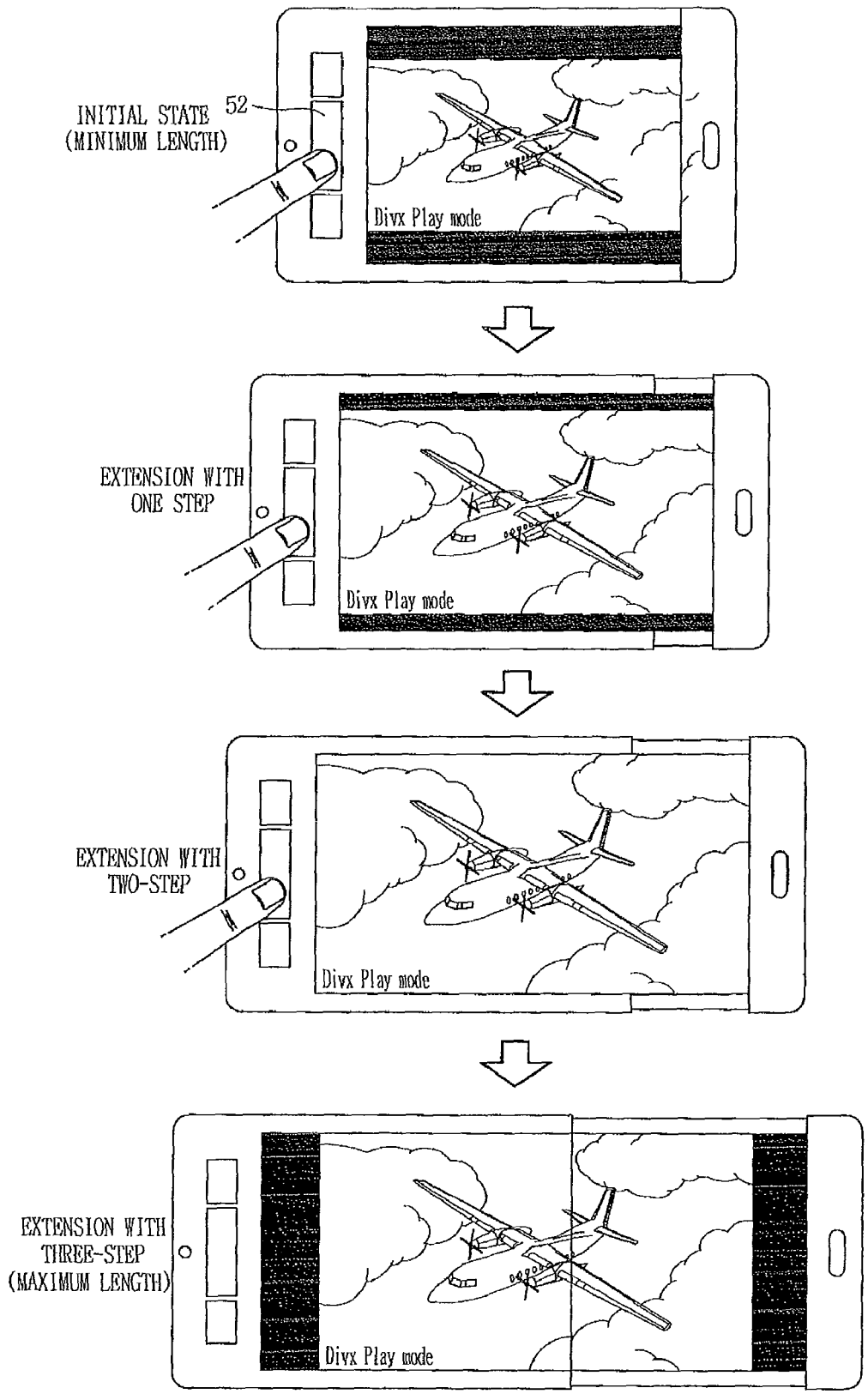
FIG. 9 is a view showing an example to manually extend the flexible LCD step by step by using an LCD slide button disposed at a lower end of the portable terminal according to the present invention.

FIG. 9 is a view showing an example to manually extend the flexible LCD step by step by using an LCD slide button disposed at a lower end of the portable terminal according to the present invention.

As shown in FIG. 9, the flexible LCD 51 may be extended step by step by using the LCD slide button 52 provided at a lower end of the portable terminal. For instance, whenever the user presses the LCD slide button 52 for a short time (less than one second), the controller 180 extends the flexible LCD 51 step by step ($1^{st}$ step~$3^{rd}$ step) from the initial state (minimum length) according to a pressed state of the button. The steps of extending the flexible LCD 51 may be preset.

Figure 10:
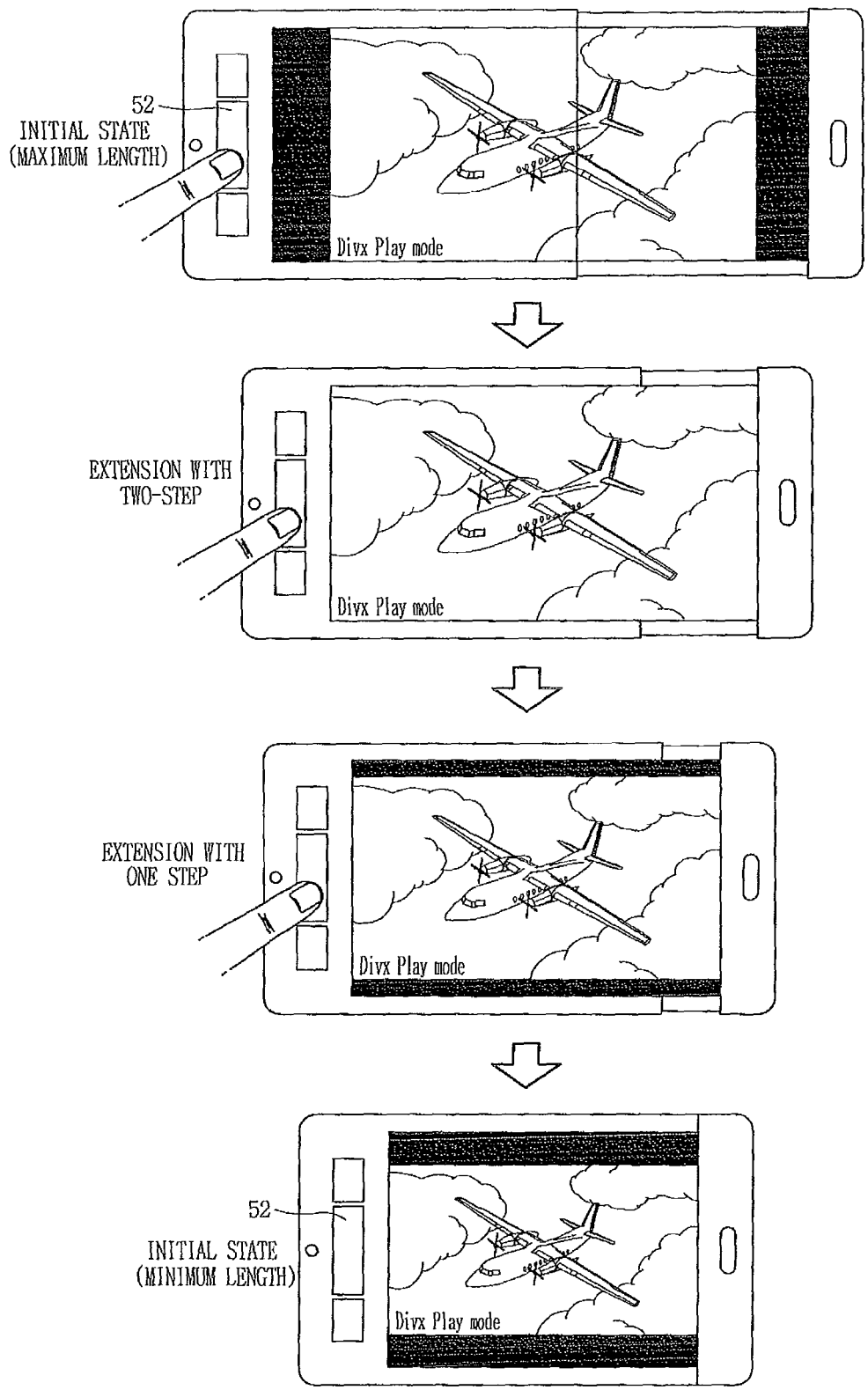
FIG. 10 is a view showing an example to manually contract the flexible LCD step by step by using the LCD slide button disposed at a lower end of the portable terminal according to the present invention.

Then, when the user re-presses the LCD slide button 52 for a short time at the $3^{rd}$ step (maximum length), as shown in FIG. 10, the controller 180 contracts the flexible LCD 51 step by step ($3^{rd}$ step~$1^{st}$ step). Here, when the user presses the LCD slide button 52 for a long time (about one second), the controller 180 restores the flexible LCD 51 to the initial state (minimum length).

Figure 11:
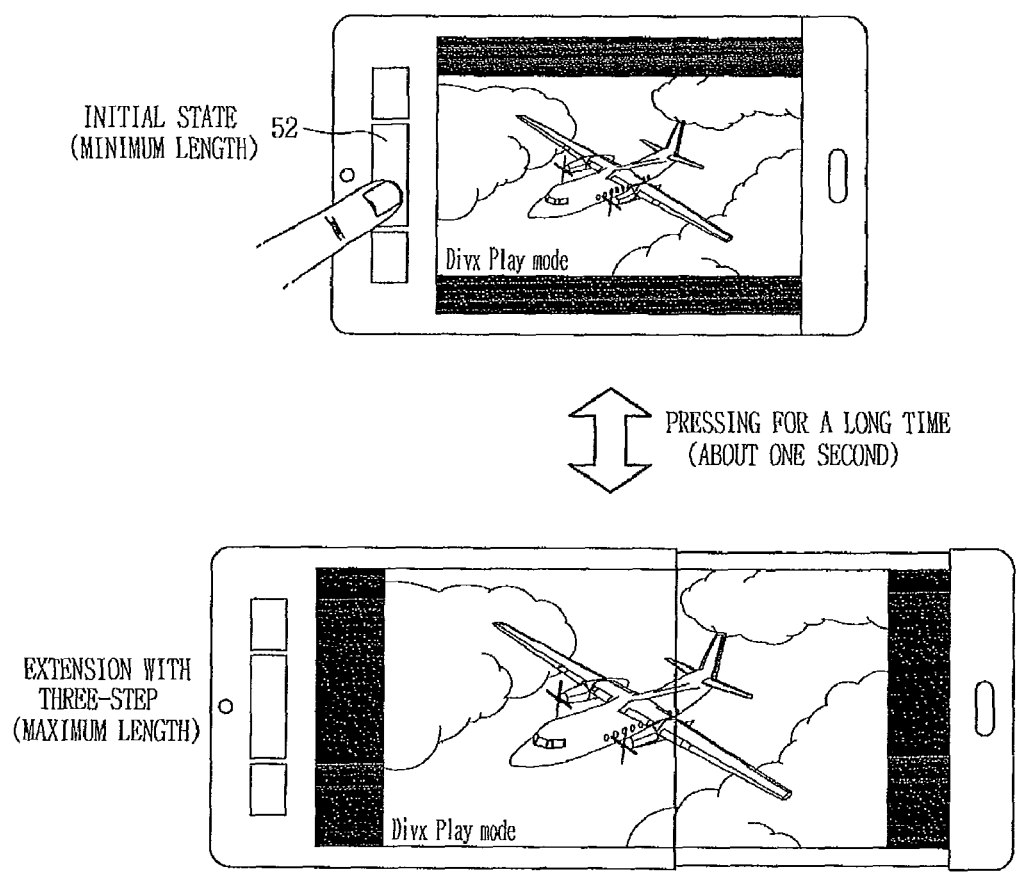
FIG. 11 is a view showing an example to extend the flexible LCD to a maximum state from a minimum state by pressing an LCD slide button for a long time.

As shown in FIG. 11, when the user presses the LCD slide button 52 for a long time (about one second) in the initial state or in a predetermined extended step ($1^{st}$ step~$2^{nd}$ step), the flexible LCD 51 is immediately extended to the $3^{rd}$ step (maximum length). And, when the user presses the LCD slide button 52 for a long time (about one second) in the $3^{rd}$ step (maximum length) or in the predetermined extended step ($1^{st}$ step~$2^{nd}$ step), the flexible LCD 51 is immediately restored to the initial state (minimum length).

The extension and contraction of the flexible LCD 51 may be automatically executed according to a setting of the system menu, or may be manually executed according to a button input by the user. Alternatively, the extended flexible LCD 51 may be automatically contracted when an incoming call is received or when dropping of the portable terminal has been detected.

Figure 12:
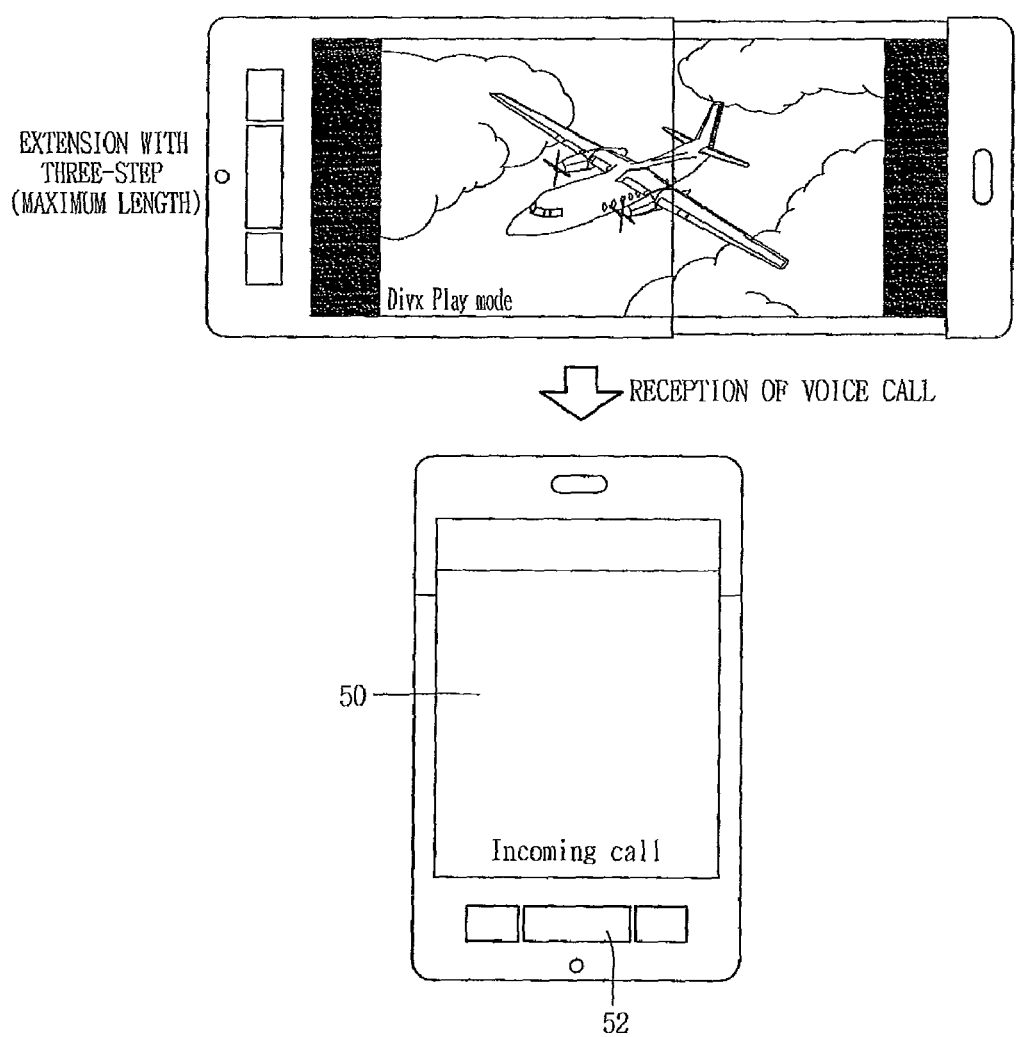
FIGS. 12 and 13 are views showing examples to restore the extended flexible LCD to an initial state when an incoming call is received.
Figure 13:
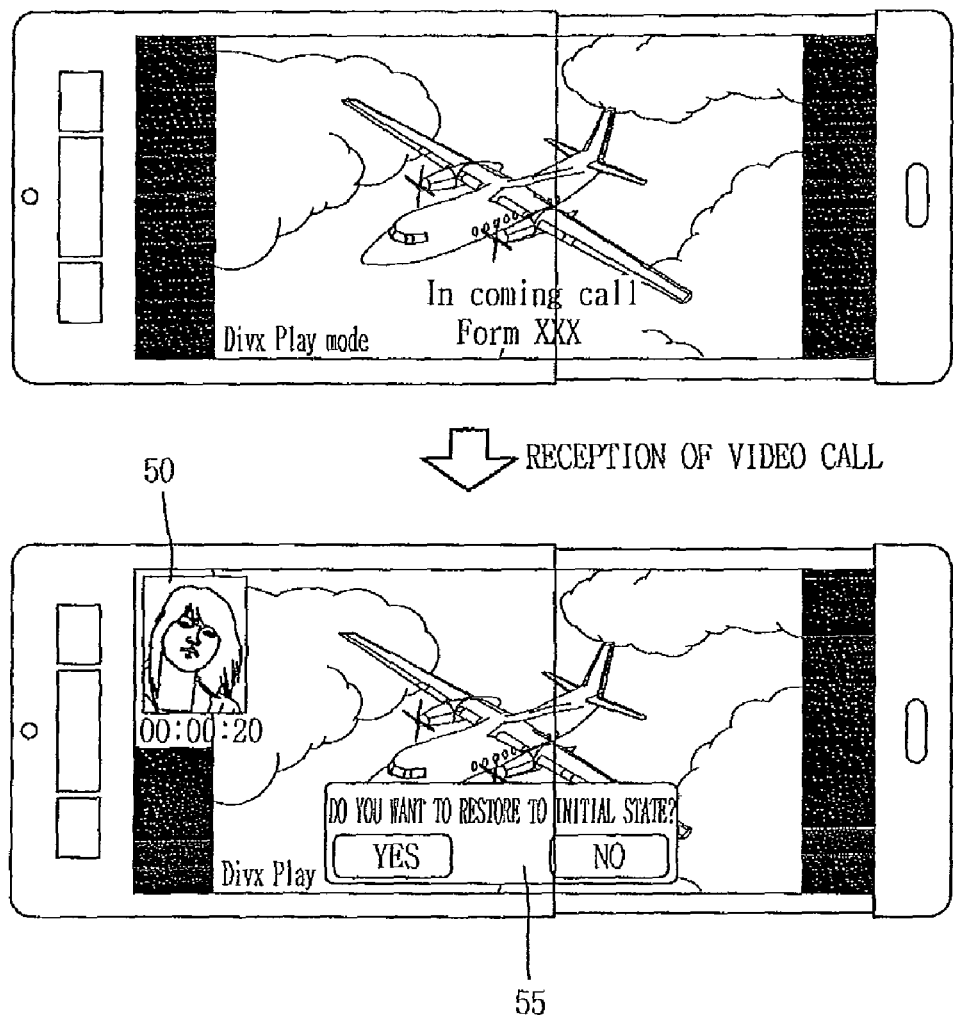

FIGS. 12 and 13 are views showing examples to restore the extended flexible LCD to the initial state when an incoming call is received.

As shown in FIG. 12, the flexible LCD 51 may be automatically extended according to a setting state of the LCD slide menu 60, or may be manually extended according to an input of the LCD slide button 52 by the user.

When an incoming call is received in a state that the flexible LCD 51 is in an extended state, the controller 180 restores the extended flexible LCD 51 to the initial state so as to determine a type of the incoming call.

If the received incoming call is a voice call as a result of the determination, the controller 180 checks whether an external headset such as a Bluetooth headset is in a connected state to the portable terminal. If so, the controller 180 controls the user to perform a voice calling by using the headset. On the other hand, if the external headset is not in a connected state to the portable terminal, the controller 180 checks a setting state of the LCD slide menu 60. If the LCD slide menu 60 has been set as an 'ON' state as a result of the check, the received incoming call is displayed at a predetermined region of the extended flexible LCD 51 in the form of a message. Then, the flexible LCD 51 is restored to the initial state. And, the message is displayed on the main LCD 50 of the portable terminal.

On the other hand, when the LCD slide menu 60 is set as an 'OFF' state, the extended flexible LCD 51 is restored to the initial state as the user presses the LCD slide button 52 or presses a call button in response to an incoming call.

When the received incoming call is a video call, as shown in FIG. 13, the controller 180 may display a video call screen on a predetermined region of the main LCD 50 in a state that the flexible LCD 51 has been extended. Then, the controller 180 may restore the extended flexible LCD 51 to the initial state according to a setting state of the LCD slide menu 60.

When the LCD slide menu 60 is set as an 'OFF' state, the controller 180 outputs a message 55 inquiring where to restore the flexible LCD 51 to the initial state or not. The controller 180 restores the flexible LCD 51 to the initial state only when the user wishes to.

Figure 14:
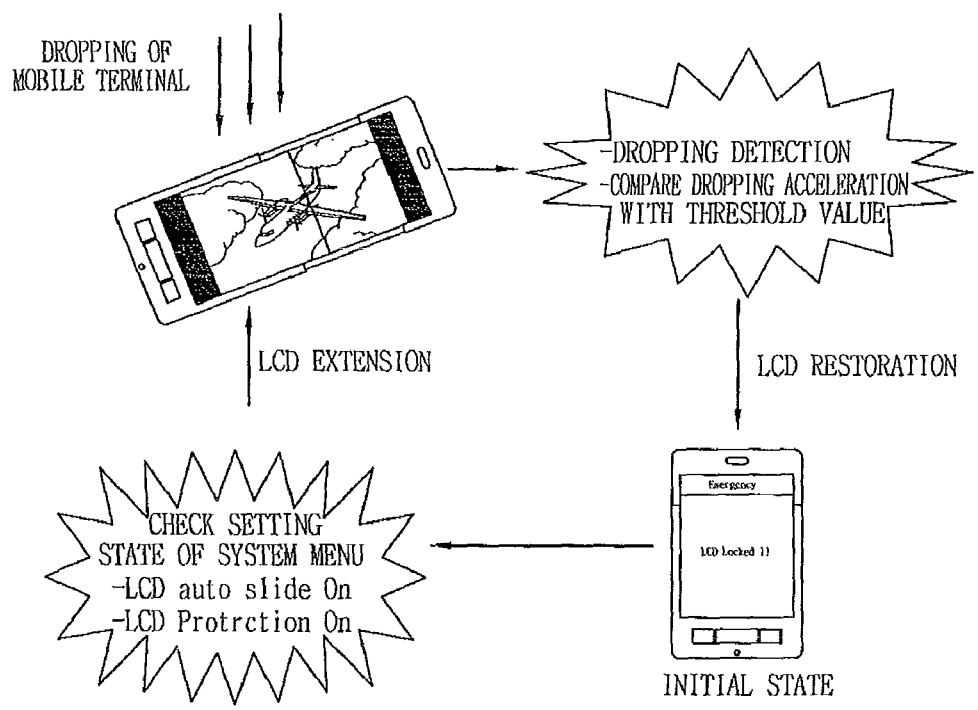
FIG. 14 is a view showing an example to restore the extended flexible LCD to an initial state when dropping of the portable terminal has been detected.

FIG. 14 is a view showing an example to restore the extended flexible LCD to an initial state when dropping of the portable terminal has been detected.

The portable terminal is fabricated to have a small size and a light weight for enhanced portability and user's convenience. Accordingly, the user may drop the portable terminal being carried or being used by mistake. This may cause the portable terminal not to be smoothly operated, or a part of the main LCD 50 or the flexible LCD 51 to be damaged. Accordingly, has been required methods for protecting the flexible LCD 51 when the portable terminal drops.

The user sets the LCD slide module 60 and the LCD protection menu 61 of the system menu shown in FIG. 7 as an 'ON' state, respectively, and stores in the memory 150 a reference value (i.e., acceleration threshold) for determining whether to drop the portable terminal or not. Once the menus have been set, the controller 180 operates the motor driving unit, the motor, and the sensing unit 140. The sensing unit 140 includes an acceleration sensor and a position sensor.

Then, when entertainments such as a film or a DMB are executed by the user, the controller 180 controls the LCD sliding motor through the motor driving unit, thereby automatically extending the flexible LCD 51 disposed in the portable terminal. This may allow the user to view entertainments such as a game, a film or a DMB on the extended screen.

Under this state, when the portable terminal drops due to the user's carelessness, the acceleration sensor of the sensing unit 140 senses an acceleration of the portable terminal to output the sensed acceleration to the controller 180. And, the controller 180 compares the sensed acceleration with the threshold value pre-stored in the memory 160, thereby determining whether the portable terminal has dropped or not.

When the sensed acceleration exceeds the threshold value as a result of the comparison, the controller 180 determines that the portable terminal is in a dropping state. And, the controller 180 controls the LCD sliding motor, thereby quickly restoring the slid flexible LCD 51 to the initial state (emergency mode).

Accordingly, the flexible LCD 51 is quickly restored to inside of the body thus to be stably protected even if the portable terminal drops. Furthermore, even if the flexible LCD 51 is damaged, a degree of the damage may not be severe.

Hereinafter, a screen extending method for the portable terminal according to the present invention will be explained in more detail with reference to FIG. 15.

Figure 15:
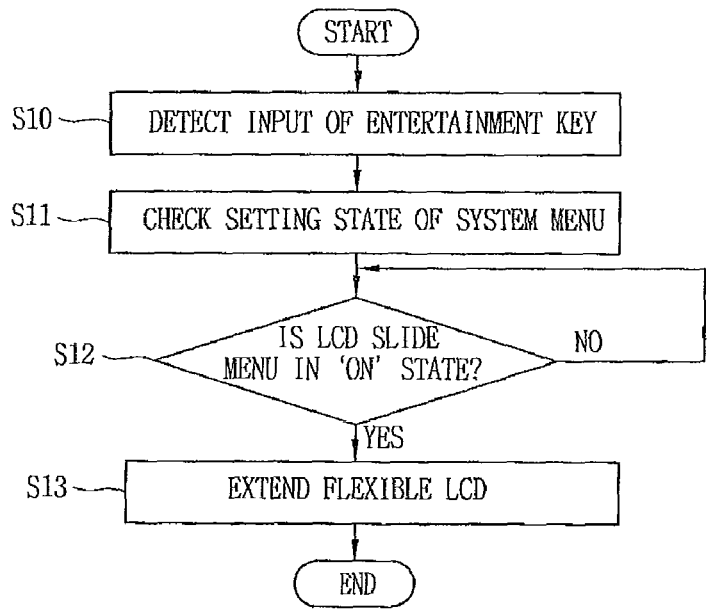
FIG. 15 is a flowchart showing a screen controlling method for a portable terminal by using a flexible display according to the present invention, in which a screen is extended.

FIG. 15 is a flowchart showing a screen controlling method for a portable terminal by using a flexible display according to the present invention, in which a screen is extended.

As shown in FIG. 15, when an input of a key such as a game key, a film key, and a DMB key (e.g., Divx player or additional entertainment key, DMB key, etc.) has been detected (S10), the controller 180 checks a setting state of the LCD slide menu 60 of the system menu (S11,S12).

When the user has set the LCD auto slide menu 60 as an 'ON' state, the controller 180 displays a current mode of the portable terminal (e.g., film mode, DMB mode, and game mode) on a predetermined region of the main LCD 50. And, the controller 180 controls the LCD sliding motor, thereby automatically sliding the flexible LCD 51 disposed in the main LCD 50 to a vertical direction (S13).

When the flexible LCD 51 is to be slid to the outside, the controller 180 controls a sliding degree of the flexible LCD 51 according to a current mode of the portable terminal (e.g., film mode, DMB mode, and game mode). Preferably, the controller 180 controls the flexible LCD 51 to be slid (extended) to the maximum in a film viewing mode, whereas the controller 180 controls the flexible LCD 51 to be slid (extended) to the minimum in a game mode or a DMB mode.

While the flexible LCD 51 is slid to the outside, when an external force against the sliding is applied to the portable terminal, the controller 180 controls the LCD sliding motor, thereby restoring the flexible LCD 51 to the initial state.

Figure 16:
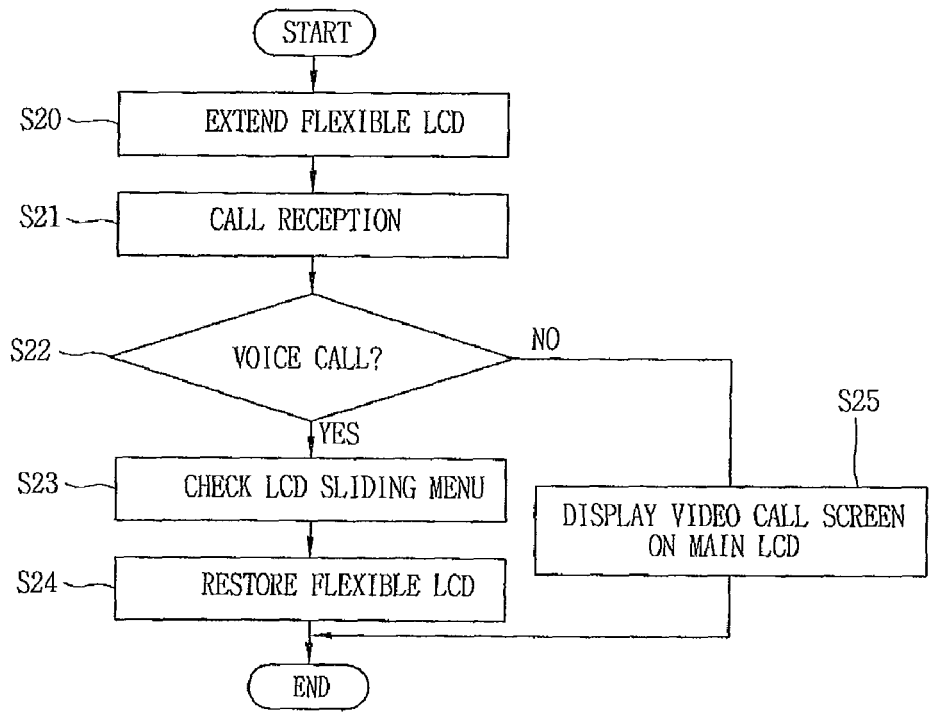
FIG. 16 is a flowchart showing a screen controlling method for a portable terminal when an incoming call is received, in which the extended screen is restored to an initial state according to a first embodiment of the present invention.

FIG. 16 is a flowchart showing a screen controlling method for a portable terminal when an incoming call is received, in which the extended screen is restored to the initial state according to a first embodiment of the present invention.

Referring to FIG. 16, the controller 180 may control the flexible LCD 51 to be automatically extended according to a setting state of the LCD sliding menu 60, or may control the flexible LCD 51 to be manually extended as the user directly presses the LCD slide button 52 (S20). For instance, the user may appreciate a film on the extended screen composed of the main LCD 50 and the flexible LCD 51.

When an incoming call is received while the user appreciates a film on the extended screen, the controller 180 determines whether the received incoming call is a voice call (S21). If the received incoming call is a voice call as a result of the determination, the controller 180 checks a setting state of the LCD slide menu 60 (S23). If the LCD sliding menu 60 is in an 'ON' state, the controller 180 displays the received call in the form of a message on the extended screen, and then restores the flexible LCD 51 to the initial state (S24).

On the other hand, if the received incoming call is a video call, the controller 180 displays a video call screen on the main LCD 50 in a state that the flexible LCD 51 has been extended (S24). And, the controller 180 outputs a message inquiring a setting state of the LCD slide menu 60 or inquiring whether the user wishes to restore the extended screen to the initial state, thereby performing a screen restoring operation.

Figure 17:
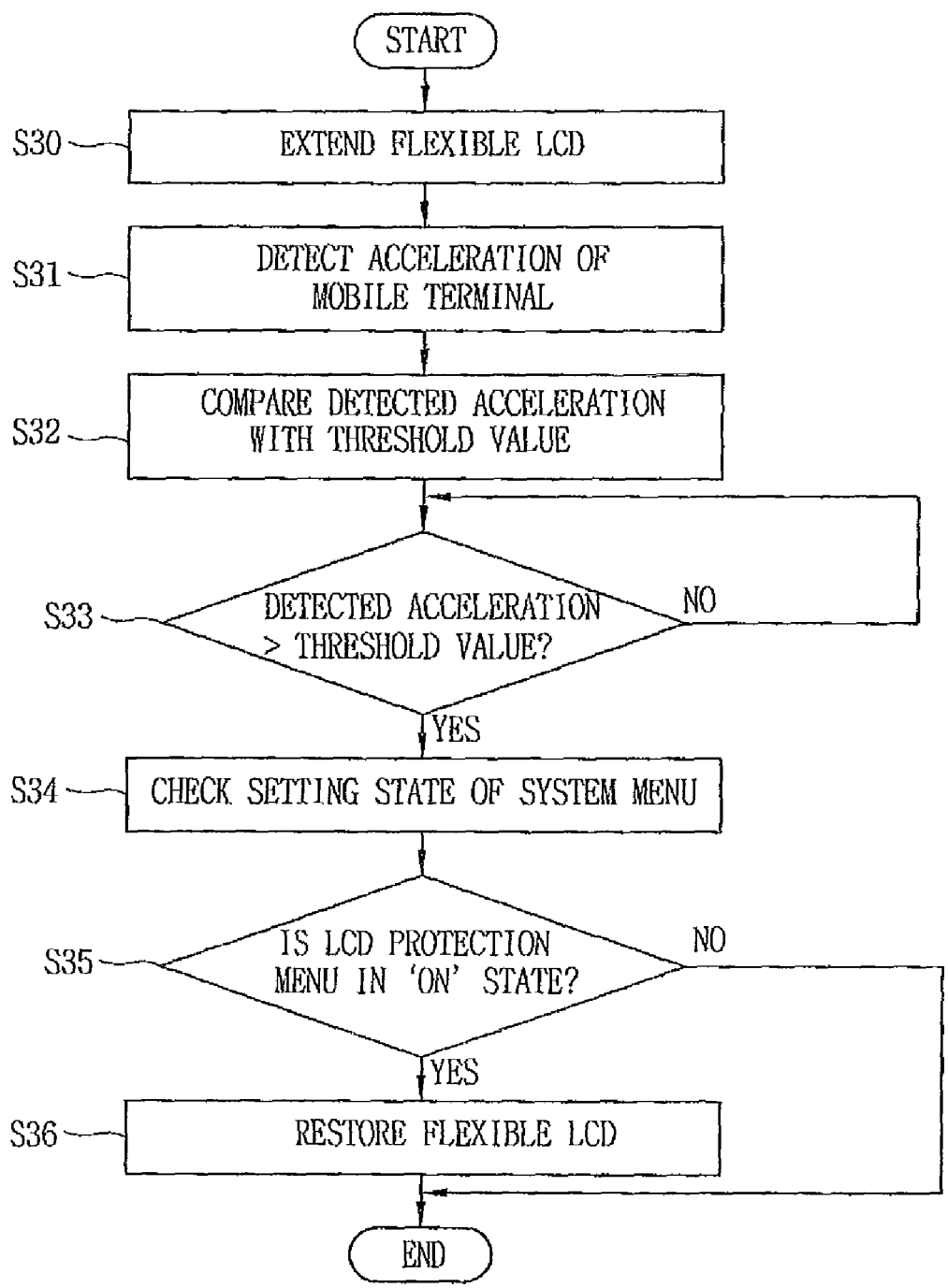
FIG. 17 is a flowchart showing a screen controlling method for a portable terminal when dropping of the portable terminal has been detected, in which the extended screen is restored to an initial state according to a second embodiment of the present invention.

FIG. 17 is a flowchart showing a screen controlling method for a portable terminal when dropping of the portable terminal has been detected, in which the extended screen is restored to the initial state according to the present invention.

The flexible LCD 51 is automatically extended by the controller 180, or is manually extended by pressing the LCD slide button 52 (S30). While the user appreciates a film on the screen extended by the flexible LCD 51, the portable terminal may drop on the floor or a specific object such as a desk by an external impact or the user's carelessness (S30).

When dropping of the portable terminal has been detected in a state that the flexible LCD 51 has been extended, the controller 180 receives an acceleration of the portable terminal from the acceleration sensor of the sensing unit 140, and then compares the received acceleration (or speed) with the threshold value stored in the memory 160 (S31, S32). The threshold value indicates an acceleration when the portable terminal drops at a height where the LCD may be damaged. Accordingly, when the detected acceleration exceeds the threshold value, it means that the LCD is likely to be damaged.

When the detected acceleration exceeds the threshold value as a result of the comparison, the controller 180 checks whether the LCD protection menu 61 of the system menu is in an 'ON' state (S33, S34)). If the LCD protection menu 61 is in an 'ON' state as a result of the check, the controller 180 controls the LCD sliding motor to be in an emergency mode, thereby rapidly restoring the extended flexible LCD 51 to the initial state. On the other hand, if the LCD protection menu 61 is in an 'OFF' state, the controller 180 ends the current step.

As aforementioned, in the present invention, when viewing a film, a game or a DMB, the flexible LCD disposed in the main LCD of the body is slid to the outside to have an extended screen. On the other hand, when an incoming call is received or an impact is applied to the portable terminal while viewing the entertainments, the extended flexible LCD is automatically restored to the initial state. This may enhance the user's convenience.

The aforementioned method may be implemented as a program code stored in a computer-readable storage medium. The storage medium may include all types of recording devices that can be read by a computer system, such as ROM, RAM, CD-ROM, a magnetic tape, a floppy disc, an optical data storage device, etc. And, the storage medium may be implemented as carrier wave (transmission through the Internet). The computer may include the controller of the portable terminal.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A screen controlling method for a portable terminal, the method comprising:
   detecting an input of a predetermined key;
   extending a screen including a main liquid crystal display (LCD) by sliding a supplementary LCD disposed in a body when the input of the predetermined key has been detected;
   executing a predetermined entertainment application on the extended screen; and
   restoring the slid supplementary LCD to an initial state when an incoming call is received while executing the entertainment application,
   wherein the step of extending the screen comprises:
   checking a setting state of an LCD slide menu when the predetermined key is input;
   automatically sliding the supplementary LCD to a vertical direction of the main LCD, when the setting state of the LCD slide menu is set to an 'ON' state; and
   displaying the entertainment application on both the main LCD and the supplementary LCD.

2. The method of claim 1, wherein the predetermined key is implemented as an entertainment key or a slide button.

3. The method of claim 2, wherein the entertainment key comprises a film key, a DMB key, a game key, and a navigation key.

4. The method of claim 1, wherein the supplementary LCD is a flexible LCD.

5. The method of claim 1, wherein the supplementary LCD is disposed in the body so as to overlap the main LCD, or is disposed at a predetermined region in a rolled scroll state so as to be slid along a guide disposed at an inner side surface of the body.

6. The method of claim 1, wherein a stiff material having a predetermined size is attached to a rear surface of the supplementary LCD.

7. The method of claim 1, wherein a sliding degree of the supplementary LCD is set to be different according to a type of the entertainment application being executed.

8. The method of claim 1, wherein the supplementary LCD is slid with a same sliding degree regardless of a type of the entertainment application being executed, by having the sliding degree set as a default.

9. The method of claim 1, further comprising:
   restoring the supplementary LCD to the initial state when a predetermined force is applied to the portable terminal while executing the entertainment application.

10. The method of claim 1, wherein the step of sliding or restoring the supplementary LCD is automatically executed according to the input of the predetermined key, or is executed step-by-step according to an input frequency and an input time of the predetermined key.

11. A screen controlling method for a portable terminal, the method comprising:
    detecting an input of a predetermined key;
    extending a screen including a main liquid crystal display (LCD) by sliding a supplementary LCD disposed in a body when the input of the predetermined key has been detected;
    executing a predetermined entertainment application on the extended screen;
    restoring the supplementary LCD to an initial state when a predetermined force is applied to the portable terminal while executing the entertainment application;
    determining whether a received incoming call is a voice call, said incoming call being received while executing the entertainment application;
    checking whether an external headset is connected to the portable terminal if the received incoming call is the voice call;
    restoring the supplementary LCD to the initial state if the external headset is not connected to the portable terminal; and
    displaying a video call screen on a predetermined region on the main LCD when the received incoming call is a video call.

12. A screen controlling method for a portable terminal, the method comprising:
    detecting an input of a predetermined key;
    extending a screen including a main liquid crystal display (LCD) by sliding a supplementary LCD disposed in a body when the input of the predetermined key has been detected;
    executing a predetermined entertainment application on the extended screen; and
    restoring the slid supplementary LCD to an initial state when an incoming call is received while executing the entertainment application,
    wherein the step of restoring the supplementary LCD further comprises:
    detecting an acceleration of the portable terminal which is dropping; and
    restoring the supplementary LCD to the initial state at a maximum speed when the detected acceleration of the portable terminal which is dropping is more than a preset threshold value.

13. A portable terminal, comprising:
    a main liquid crystal display (LCD);
    a supplementary LCD disposed in a body, and configured to be extendable to an outside of the body; and
    a controller configured to extend the screen by sliding the supplementary LCD when input of a predetermined key has been detected, to restore the slid supplementary LCD to an initial state when an incoming call is received or the portable terminal is dropping with the screen extended, to check a setting state of an LCD slide menu when the predetermined key is input, to automatically slide the supplementary LCD to a vertical direction of the main LCD, when the setting state of the LCD slide menu is set to an 'ON' state, and to display an entertainment application on both the main LCD and the supplementary LCD.

14. The portable terminal of claim 13, wherein the supplementary LCD is disposed in the body so as to overlap the main LCD, or is disposed at a predetermined region in a rolled scroll state so as to be slid along a guide disposed at an inner side surface of the body.

15. The portable terminal of claim 13, wherein the supplementary LCD is a flexible LCD.

16. The portable terminal of claim 13, wherein a strong material having a predetermined size is attached to a rear surface of the supplementary LCD so as to maintain stiffness.

17. The portable terminal of claim 13, wherein the predetermined key is implemented as an entertainment key or a slide button.

18. The portable terminal of claim 17, wherein the entertainment key comprises a film key, a DMB key, a game key, and a navigation key.

19. The portable terminal of claim 13, wherein a sliding degree of the supplementary LCD is set to be different according to a type of the entertainment application being executed.

20. The portable terminal of claim 13, wherein a sliding degree of the supplementary LCD is set as a default.

21. The portable terminal of claim 13, wherein the controller slides the supplementary LCD step by step according to an input frequency of the slide button.

22. A portable terminal, comprising:
a main liquid crystal display (LCD);
a supplementary LCD disposed in a body, and configured to be extendable to an outside of the body; and
a controller configured to extend the screen by sliding the supplementary LCD when input of a predetermined key has been detected, to restore the slid supplementary LCD to an initial state when an incoming call is received or the portable terminal is dropping with the screen extended, to restore the supplementary LCD to the initial state when the incoming call is a voice call, and to display a video call screen on the main LCD and supplementary LCD and display a message inquiring whether to restore the supplementary LCD to the initial state when the incoming call is a video call.

23. A portable terminal, comprising:
a main liquid crystal display (LCD);
a supplementary LCD disposed in a body, and configured to be extendable to an outside of the body; and
a controller configured to extend the screen by sliding the supplementary LCD when input of a predetermined key has been detected, to restore the slid supplementary LCD to an initial state when an incoming call is received or the portable terminal is dropping with the screen extended, to restore the supplementary LCD to the initial state in an emergency mode when it has been detected that an acceleration of the portable terminal which is dropping is more than a threshold value.

* * * * *